(12) United States Patent
Gutmann et al.

(10) Patent No.: US 11,004,000 B1
(45) Date of Patent: May 11, 2021

(54) PREDICTING TRAJECTORY INTERSECTION BY ANOTHER ROAD USER

(71) Applicant: Waymo LLC, Mountain View, CA (US)

(72) Inventors: Jens-Steffen Ralf Gutmann, Cupertino, CA (US); Zhinan Xu, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 787 days.

(21) Appl. No.: 15/418,981

(22) Filed: Jan. 30, 2017

(51) Int. Cl.
*G06N 5/04* (2006.01)
*G05D 1/00* (2006.01)
*G06N 20/00* (2019.01)

(52) U.S. Cl.
CPC ............. *G06N 5/04* (2013.01); *G05D 1/0088* (2013.01); *G06N 20/00* (2019.01)

(58) Field of Classification Search
CPC .......... G06N 5/04; G06N 20/00; G06N 20/10; G06N 20/20; G05D 1/0088
See application file for complete search history.

(56) References Cited

U.S. PATENT DOCUMENTS

| | | | |
|---|---|---|---|
| 8,346,512 B2 * | 1/2013 | McAree | B60T 7/22 370/338 |
| 8,706,394 B2 | 4/2014 | Trepagnier et al. | |
| 9,180,882 B1 * | 11/2015 | Dolgov | G08G 1/16 |
| 9,248,834 B1 * | 2/2016 | Ferguson | B60W 30/09 |
| 9,501,915 B1 * | 11/2016 | Laska | H04N 7/181 |
| 9,998,804 B2 * | 6/2018 | Awiszus | A62B 99/00 |
| 10,380,881 B2 * | 8/2019 | Xu | G08B 13/187 |
| 2004/0019420 A1 * | 1/2004 | Rao | B60R 21/013 701/45 |
| 2012/0306663 A1 * | 12/2012 | Mudalige | G08G 1/163 340/903 |
| 2013/0274986 A1 * | 10/2013 | Trepagnier | G01S 17/023 701/26 |
| 2015/0258992 A1 * | 9/2015 | Sawamoto | B60W 30/14 701/1 |

(Continued)

OTHER PUBLICATIONS

Houenou, Adam, et al. "Vehicle trajectory prediction based on motion model and maneuver recognition." 2013 IEEE/RSJ international conference on intelligent robots and systems. IEEE, 2013. (Year: 2013).*

(Continued)

*Primary Examiner* — Hal Schnee
(74) *Attorney, Agent, or Firm* — Botos Churchill IP Law

(57) ABSTRACT

The technology relates to predicting that an object is going to enter into a trajectory of a vehicle. This may include receiving sensor data identifying a first location of the object in an environment of the vehicle at a first point in time and receiving sensor data identifying a second location of the object in the environment at a second point in time. In addition, a boundary of the trajectory is determined by defining at least a two-dimensional area through which the vehicle is expected to travel in the future. A first distance between the boundary and the first location and a second distance between the trajectory and the second location are determined. The first distance and the second distance are used to determine that the object is going to enter into the trajectory at a future point in time.

20 Claims, 12 Drawing Sheets

(56) References Cited

U.S. PATENT DOCUMENTS

| | | | | |
|---|---|---|---|---|
| 2016/0052515 | A1* | 2/2016 | Choi | B60W 30/0956 |
| | | | | 701/1 |
| 2017/0120902 | A1* | 5/2017 | Kentley | B60W 10/04 |
| 2017/0329000 | A1* | 11/2017 | Masui | B60W 30/16 |
| 2018/0001952 | A1* | 1/2018 | Rajamani | B62J 3/00 |
| 2018/0150701 | A1* | 5/2018 | Kang | G06K 9/78 |

OTHER PUBLICATIONS

Tan, Yi, Feng Han, and Faroog Ibrahim. "A radar guided vision system for vehicle validation and vehicle motion characterization." 2007 IEEE Intelligent Transportation Systems Conference. IEEE, 2007. (Year: 2007).*

Di, Zhipeng, and Dongzhi He. "Forward collision warning system based on vehicle detection and tracking." 2016 International Conference on Optoelectronics and Image Processing (ICOIP). IEEE, 2016. (Year: 2016).*

\* cited by examiner

PREDICTING TRAJECTORY INTERSECTION BY ANOTHER ROAD USER

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

Such vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.). These characteristics can be used to predict what an object is likely to do for some brief period into the future which can be used to control the vehicle in order to avoid these objects. Thus, detection, identification, and prediction are critical functions for the safe operation of autonomous vehicle.

In addition to using sensors, these vehicles may rely on highly detailed maps of their environment. This map information is critical for both navigation (determining how to get between two locations) and localization (determining where the vehicle is in the world). The combination of maps and sensor information may allow the vehicle's computing devices to reason to some limited extent about what other objects are doing, including whether those objects are going to "cut into", or rather enter into, the lane of the vehicle.

In certain circumstances, determining whether another object is attempting to enter into the lane of an autonomous vehicle may be nearly impossible to do. One example of such circumstances may include when the map information is not accurate enough, map features (such as lane lines) are difficult to detect because they are faded or non-existent. Another example of such circumstances may be where the vehicle and the object may not be following the map. This may be due to any number of reasons, including, for instance, where both are moving around another object, the curvature of the road causes a vehicle to get closer to a lane boundary on a turn, or where lane markings, such as at intersections, can be overlapping or confusing.

BRIEF SUMMARY

Aspects of the disclosure provide a method for predicting that an object is going to enter into a trajectory of a vehicle. The method includes receiving, by one or more processors of one or more computing devices, sensor data identifying a first location of the object in an environment of the vehicle at a first point in time; receiving, by the one or more processors, sensor data identifying a second location of the object in the environment at a second point in time; determining, by the one or more processors, a boundary of the trajectory, the boundary defining at least a two-dimensional area through which the vehicle is expected to travel over a period of time; determining, by the one or more processors, a first distance between the boundary and the first location and a second distance between the trajectory and the second location; and predicting, by the one or more processors, that the object is going to enter into the trajectory at a future point in time based on at least the first distance and the second distance.

In one example, predicting that the object is going to enter into the trajectory is further based on a difference in time between the first point in time and the second point in time. In another example, predicting that the object is going to enter into the trajectory is not based on pre-stored map information describing the environment of the vehicle. In another example, the boundary defines a three-dimensional area. In another example, predicting that the object is going to enter into the trajectory includes predicting a future location of the object at the future point in time based on at least the first distance and the second distance; and determining a third distance between the boundary and the future point in time, and the third distance is used to predict that the object is going to enter into the trajectory. In this example, predicting that the object is going enter into the trajectory includes comparing the third distance to a threshold distance. In another example, predicting that the object is going to enter into the trajectory includes predicting a future location of the object at the future point in time based on at least the first distance and the second distance; and determining whether the future location is within the boundary. In another example, predicting that the object is going to enter into the trajectory includes using the first distance and the second distance as input into a machine learning model. In another example, the method also includes, prior to determining the first distance and the second distance, identifying the object as an object that may want to enter into the trajectory based on either the first location or the second location. In this example, identifying the object is based on whether the first location or second location indicates that the object is in a lane adjacent to the lane of the vehicle. In addition, the lane adjacent and the lane of the vehicle both follow a given directional flow of traffic.

Another aspect of the disclosure provides a system for predicting that an object is going to enter into a trajectory of a vehicle. The system includes one or more processors configured to receive sensor data identifying a first location of the object in an environment of the vehicle at a first point in time; receive sensor data identifying a second location of the object in the environment at a second point in time; determine a boundary of the trajectory, the boundary defining at least a two-dimensional area through which the vehicle is expected to travel over a period of time; determine a first distance between the boundary and the first location and a second distance between the trajectory and the second location; and predict that the object is going to enter into the trajectory at a future point in time based on at least the first distance and the second distance.

In one example, predicting that the object is going to enter into the trajectory is not based on pre-stored map information describing the environment of the vehicle. In another example, the boundary defines a three-dimensional area. In another example, the one or more processors are configured to predict that the object is going to enter into the trajectory by predicting a future location of the object at the future point in time based on at least the first distance and the second distance; and determining a third distance between the boundary and the future point in time, and the third distance is used to predict that the object is going to enter into the trajectory. In this example, the one or more processors are configured to predict that the object is going to enter into the trajectory by comparing the third distance to a threshold distance. In another example, the one or more processors are configured to predict that the object is going to enter into the trajectory by predicting a future location of the object at the future point in time based on at least the first distance and the second distance, and determining whether the future location is within the boundary. In another example, the one or more processors are configured to predict that the object is going to enter into the trajectory by using the first distance and the second distance as input into a machine learning model. In another example, the system also includes the vehicle.

A further aspect of the disclosure provides a method for predicting that an object is going to enter into a trajectory of a vehicle. The method includes receiving, by one or more processors of one or more computing devices, sensor data identifying a location of the object in an environment of the vehicle at a first point in time and a lateral speed of the object at the first point in time; determining, by the one or more processors, a boundary of the trajectory, the boundary defining at least a two-dimensional area through which the vehicle is expected to travel over a period of time; determining, by the one or more processors, a distance between the boundary and the location; and predicting, by the one or more processors, that the object is going to enter into the trajectory at a future point in time based on at least the distance and the lateral speed.

DETAILED DESCRIPTION

Overview

Figure 1:
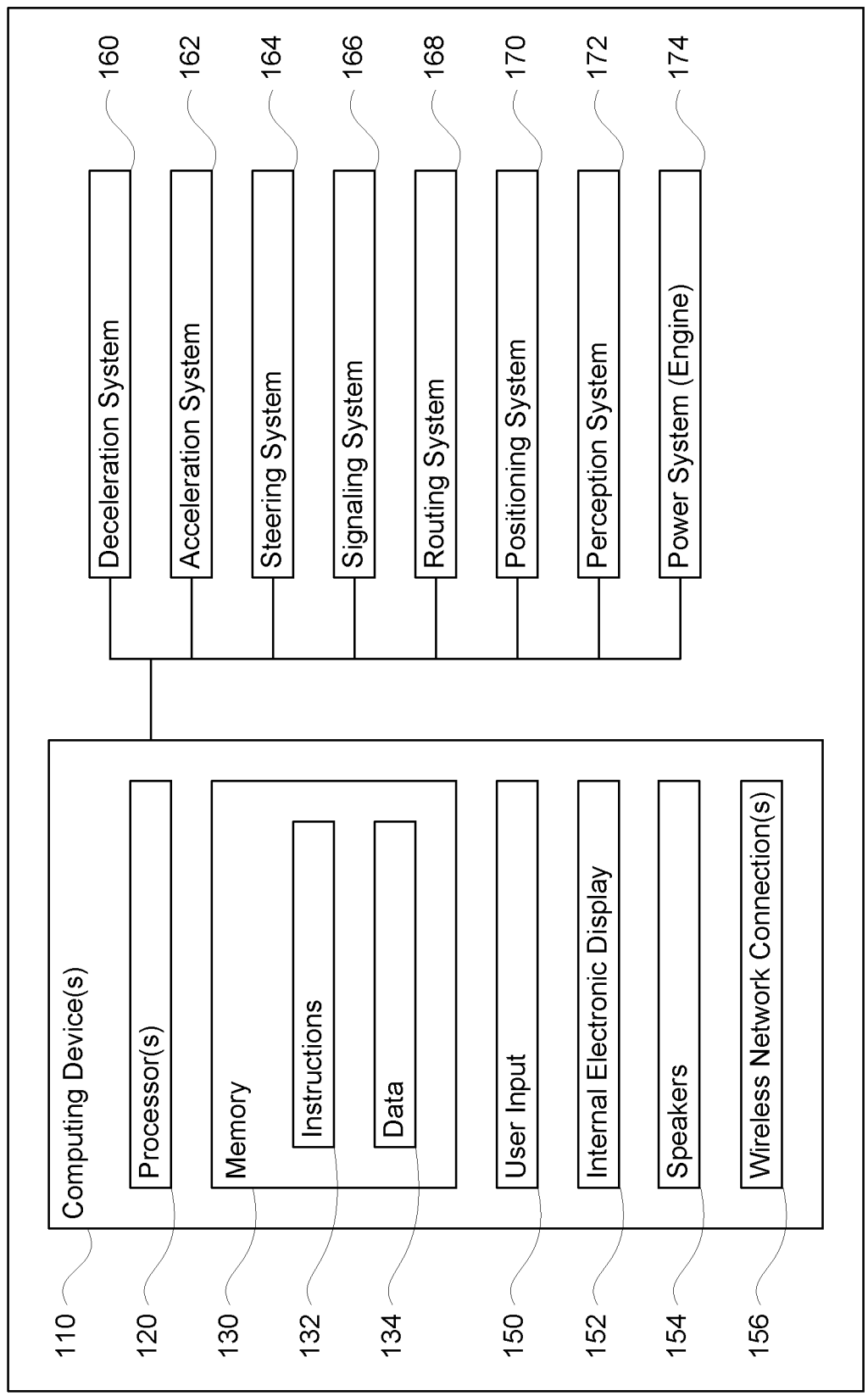
FIG. 1 is a functional diagram of an example vehicle in accordance with aspects of the disclosure.

Aspects of the technology relate to predicting future locations of an object in an environment of an autonomous vehicle or a vehicle having an autonomous driving mode. In particular, if the object is another road user, such as a pedestrian, bicyclist, or another vehicle, computing devices of the autonomous vehicle may determine whether that object is going to enter into the lane of the vehicle, for instance, directly in front of or behind the vehicle. To increase accuracy as wells as reduce time and processing costs, rather than determining whether an object is going to enter into a lane of the vehicle, the vehicle's computing devices may determine on whether the object is going to enter into or intersect with the trajectory of the vehicle. In this way, the computing devices need not rely on map information, but the determination may be based on the vehicle's trajectory as well as information about the object observed by the vehicle's sensors.

The autonomous vehicle's trajectory may be identified as a two-dimensional (2D) or three-dimensional (3D) boundary through which the autonomous vehicle is currently moving and will move through for some fixed distance or amount of time into the future. In this regard, the width of the autonomous vehicle's trajectory may correspond to the width of the vehicle with or without some additional safety buffer. Because the trajectory is based on pre-stored map information, destination information, as well as information detected by the vehicle's perception system, the trajectory may be updated several times per second.

As the vehicle moves through its environment, following the trajectory, the autonomous vehicle's perception system may detect and identify objects. The data generated by the perception system may include information such as location at a given point in time. At least some of these objects may be identified as relevant for determining whether the object is going to enter into the trajectory.

With multiple observations of the same object over time, additional information about the object may be identified. This additional information may include lateral gap between the object and the trajectory, relative orientation (or in other words, the orientation of the object relative to the orientation of the autonomous vehicle) as well as the lateral speed.

The prior observed location, current observed location, lateral gap, lateral speed, and relative orientation may be used to determine whether the object will enter into the trajectory of the vehicle. For instance, this information may be used to predict a future trajectory of the object including one or more future locations of the object. If a future location is within the trajectory or within a threshold distance of the trajectory, the object may be identified as an object that is attempting to enter into the trajectory of the vehicle. In other words, if the future lateral gap indicates that there is overlap or that the lateral gap is less than a threshold value, the object may be identified as an object that is attempting to cut-in.

The features described herein may allow the autonomous vehicle to make better driving decisions, and in some cases to make those decisions faster. For instance, this may include slowing the autonomous vehicle down or changing the trajectory of the autonomous vehicle in order to allow the object to cut-in comfortably. Moreover, a prediction that an object will enter into the trajectory of the vehicle can be achieved with very little information and processing resources. For example, at a minimum, the boundary of the trajectory of the vehicle, a current observed location of an object and one other data point such as a lateral speed of the object or prior observed location of the object are needed to make the prediction. This provides a very simplified analysis for detecting that an object is going to enter into the trajectory of the vehicle. Also, the features described herein can be used as a secondary system to more sophisticated lane changing systems. For example, a primary lane change prediction system may predict lane-changes of other objects but may rely on significantly more and different information, for instance, to determine if an object is going to enter into a lane of the vehicle (as opposed to a 2D or 3D boundary of a trajectory). In this way, the features described herein may provide redundancy and thus increased safety in the event the primary system does not detect that an object is going to enter into the trajectory of the vehicle.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be an autonomous driving computing system incorporated into vehicle 100. The autonomous driving computing system may capable of communicating with various components of the vehicle. For example, returning to FIG. 1, computing devices 110 may be in communication with various systems of vehicle 100, such as deceleration system 160, acceleration system 162, steering system 164, signaling system 166, routing system 168, positioning system 170, and perception system 172, and power system 174, for instance a gas or diesel powered engine or electric motor, in order to control the movement, speed, etc. of vehicle 100 in accordance with the instructions 132 of memory 130. Again, although these systems are shown as external to computing devices 110, in actuality, these systems may also be incorporated into computing devices 110, again as an autonomous driving computing system for controlling vehicle 100.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Routing system 168 may be used by computing devices 110 in order to determine and follow a route to a location. In this regard, the routing system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways. In addition, this map information may include information regarding traffic controls, such as traffic signal lights, stop signs, yield signs, etc., which, in conjunction with real time information received from the perception system 172, can be used by the computing devices 110 to determine which directions of traffic have the right of way at a given location.

The map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with greater accuracy than absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing devices 110. In the case where the vehicle is a small passenger vehicle such as a car, the car may include a laser or other sensors mounted on the roof or other convenient location. For instance, a vehicle's perception system may use various sensors, such as LIDAR, sonar, radar, cameras, etc. to detect objects and their characteristics such as location, orientation, size, shape, type, direction and speed of movement, etc. The raw data from the sensors and/or the aforementioned characteristics can be quantified or arranged into a descriptive function or vector for processing by the computing devices 110. As discussed in further detail below, computing devices 110 may use the positioning system 170 to determine the vehicle's location and perception system 172 to detect and respond to objects when needed to reach the location safely.

Figure 2A:
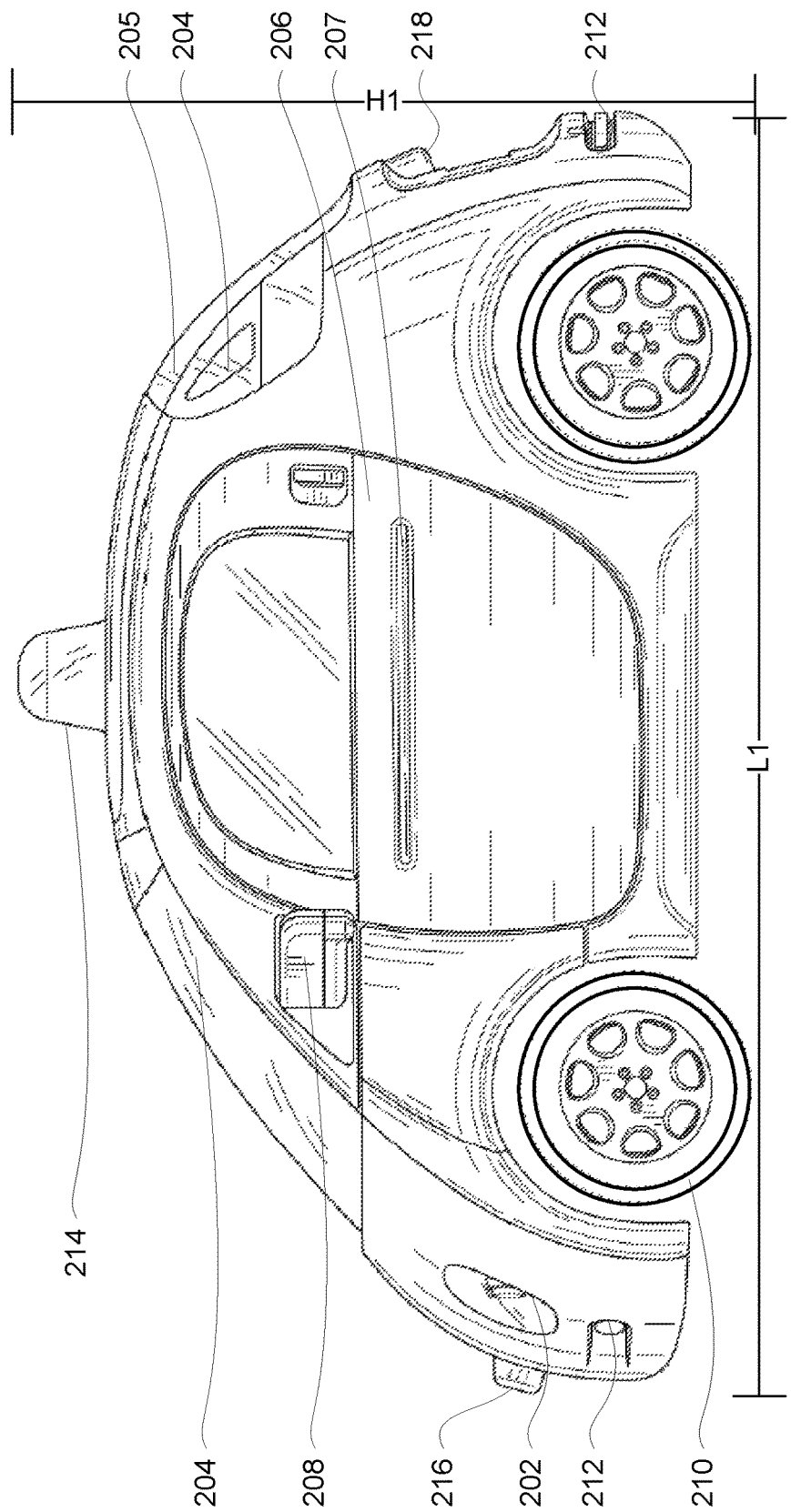
FIGS. 2A-2D are example external views of a vehicle in accordance with aspects of the disclosure.
Figures 2B, 2C:
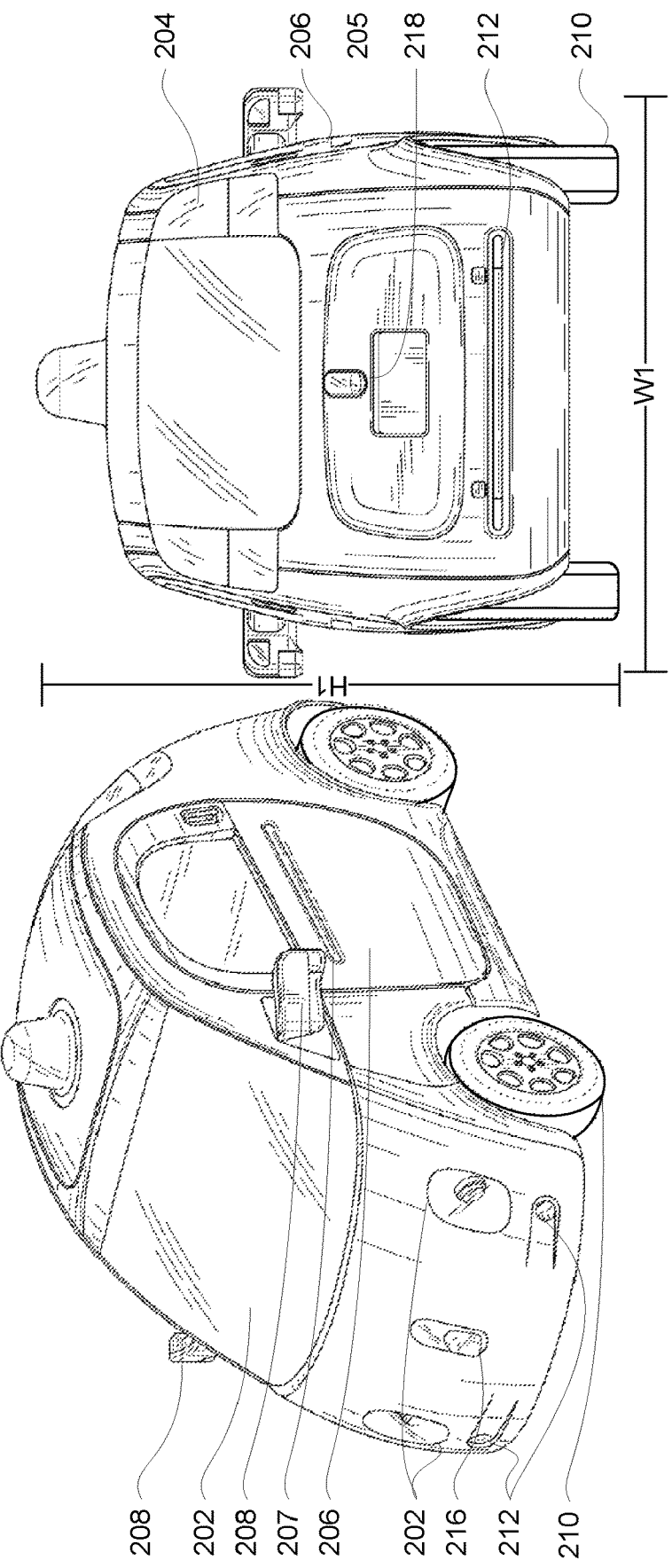
Figure 2D:
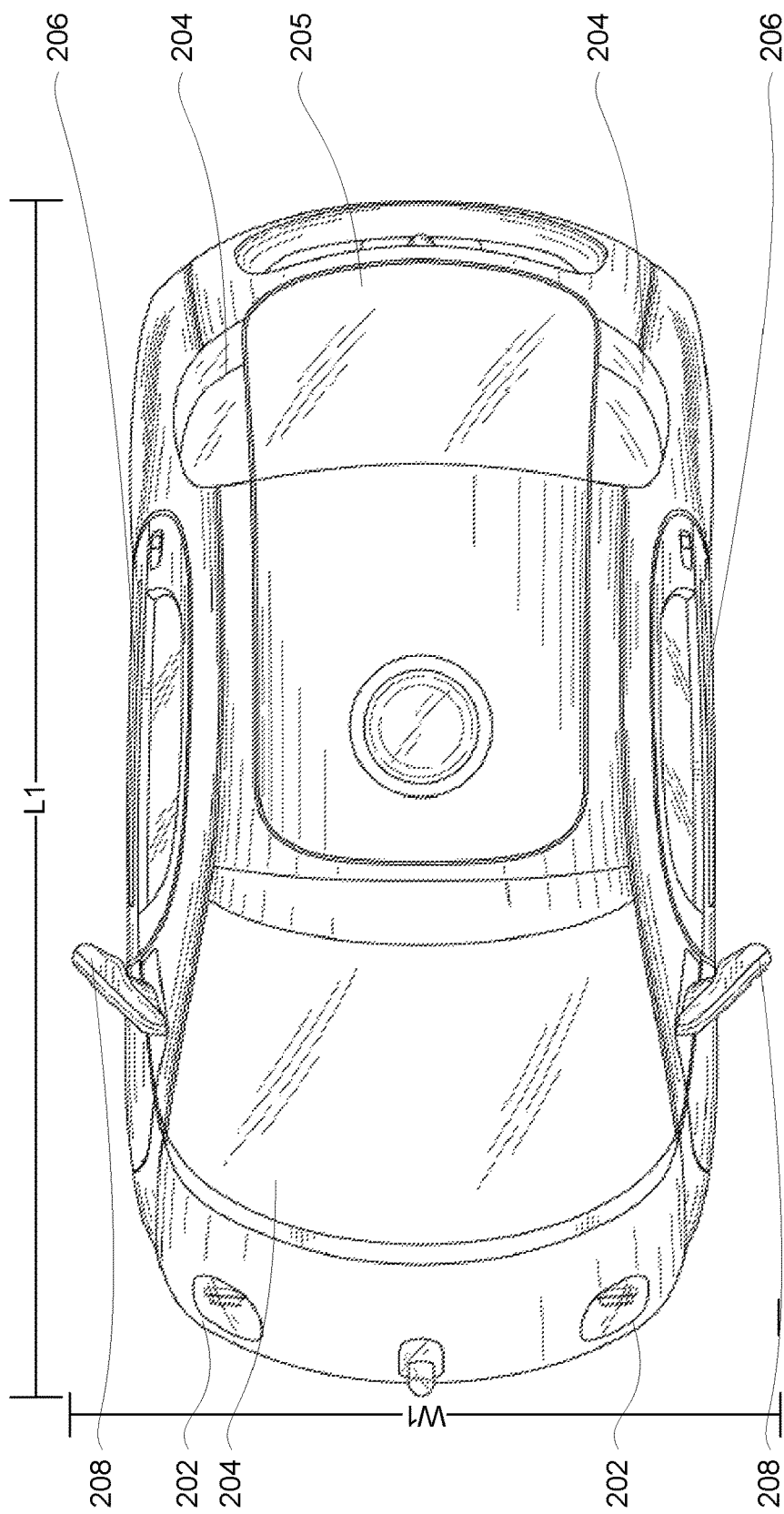

FIGS. 2A-2D are examples of external views of vehicle 100 having a width dimension W1 (as shown in FIGS. 2A and 2C), a length dimension L1 (as shown in FIG. 2D), and a height dimension H1 (as shown in FIGS. 2B, 2C and 2D). As can be seen, vehicle 100 includes many features of a typical vehicle such as headlights 202, windshield 204, taillights/turn signal lights 204, rear windshield 205, doors 206, side view mirrors 208, tires and wheels 210, and turn signal/parking lights 212. Headlights 202, taillights/turn signal lights 204, and turn signal/parking lights 212 may be associated with the signaling system 166. Light bar 207 may also be associated with the signaling system 166.

Vehicle 100 also includes sensors of the perception system 172. For example, housing 214 may include one or more laser devices for having 260 degree or narrower fields of view and one or more camera devices. Housings 216 and 218 may include, for example, one or more radar and/or sonar devices. The devices of the perception system 172 may also be incorporated into the typical vehicle components, such as taillights/turn signal lights 204 and/or side view mirrors 208. Each of these radar, camera, and lasers devices may be associated with processing components which process data from these devices as part of the perception system 172 and provide sensor data to the computing devices 110.

The computing devices 110 may control the direction and speed of the vehicle by controlling various components. By way of example, computing devices 110 may navigate the vehicle to a destination location completely autonomously using data from the detailed map information, perception system 172, and routing system 168. In order to maneuver the vehicle, computing devices 110 may cause the vehicle to accelerate (e.g., by increasing fuel or other energy provided to the power system 174 by acceleration system 162), decelerate (e.g., by decreasing the fuel supplied to the power system 174, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between a power system 174 of the vehicle and the wheels of the vehicle. Again, by controlling these systems, computing devices 110 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Once a passenger, is safely in the vehicle, the computing devices 110 may initiate the necessary systems to control the vehicle autonomously along a route to the destination location. For instance, the routing system 168 may use the map information of data 134 to determine a path or route to the destination location that follows a set of the lane segments of map information. The computing devices 110 may then maneuver the vehicle autonomously (or in an autonomous driving mode) as described above along the route towards the destination.

In order to follow the route, the computing devices 110 may periodically determine a trajectory for the vehicle. For example, using the route as a baseline, the computing devices may generate a set of future locations of the vehicle in order to both follow the route using the detailed map information and avoid close interaction with other road users, such as pedestrians, bicyclists, and pedestrians. These future locations may be used by the computing devices to guide the steering, acceleration and/or deceleration of the vehicle in order to follow the route.

Figure 3:
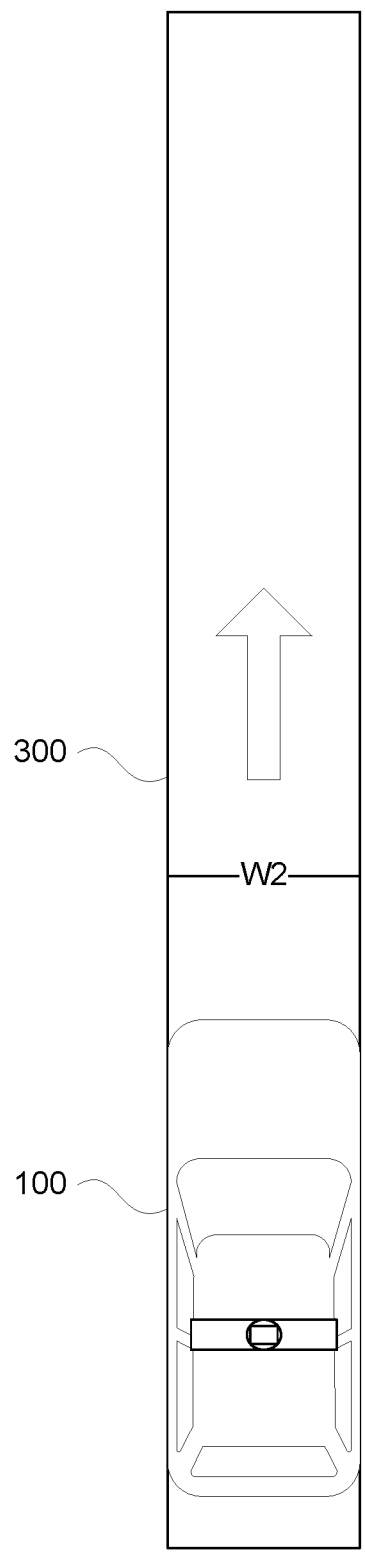
FIGS. 3-8B are example representations of a vehicle and data in accordance with aspects of the disclosure.

These points may be converted to the area of the world through which the vehicle will move, for example, by adding a length, width, and in some cases a height dimension, or in other words, forming a boundary of the trajectory. In one example, as is shown in FIG. 3, vehicle 100 is currently following trajectory 300, the boundary of which is depicted here as a 2D area. The width W2 of the boundary of trajectory 300 may correspond to the width W1 of the vehicle with or without some additional safety buffer, for example of 6 inches or more or less. The length of the boundary of trajectory 300 may correspond to the aforementioned fixed distance or how far the vehicle is expected to travel over the amount of time into the future. Thus, the length of the boundary of trajectory 300 may be based on the expected speed of the vehicle as it travels along the trajectory.

Although depicted in FIG. 3 as a 2D area, the boundary of the trajectory may actually be defined in three dimensions. For example, the boundary of the trajectory may be given a height dimension that corresponds to the height H1 of the vehicle with or without some additional safety buffer of for instance, 6 inches or more or less, in order to avoid interaction with overhead objects such as low hanging tree branches or bird.

Because the trajectory is based on the map information as well as information detected by the perception system 172 and provided to the computing devices 110, the trajectory may be updated several times per second in order to incorporate the most up to date information from the perception system 172. In this regard, unless otherwise stated, the boundary of the trajectory as discussed below may be the boundary of the most recently generated trajectory to ensure safe interaction and avoid collisions with other road users, such as pedestrians, bicyclists, and other vehicles.

As the vehicle moves through its environment, following the trajectory, the perception system 172 may detect and identify objects. At least some of these objects may correspond to other road users such as pedestrians, bicyclists and vehicles which could potentially enter into the most recently generated trajectory of the autonomous vehicle. The data generated by the perception system 172 may include information such as observed locations of these objects and dimensions of these objects, for example represented by bounding boxes, at a given point in time. In some examples, the perception system 172 may provide more detailed information such as lateral speed, heading, velocity, etc. At least some of these objects may be identified as relevant for determining whether the object is going to enter into the trajectory, such as objects that are both moving (for instance, going at least 0.5 meters per second or more) and traveling in adjacent lanes of traffic with a similar heading or directional flow of traffic (for instance, both the autonomous vehicle and the object are traveling in the "Northbound" lanes of a highway).

Figure 4:
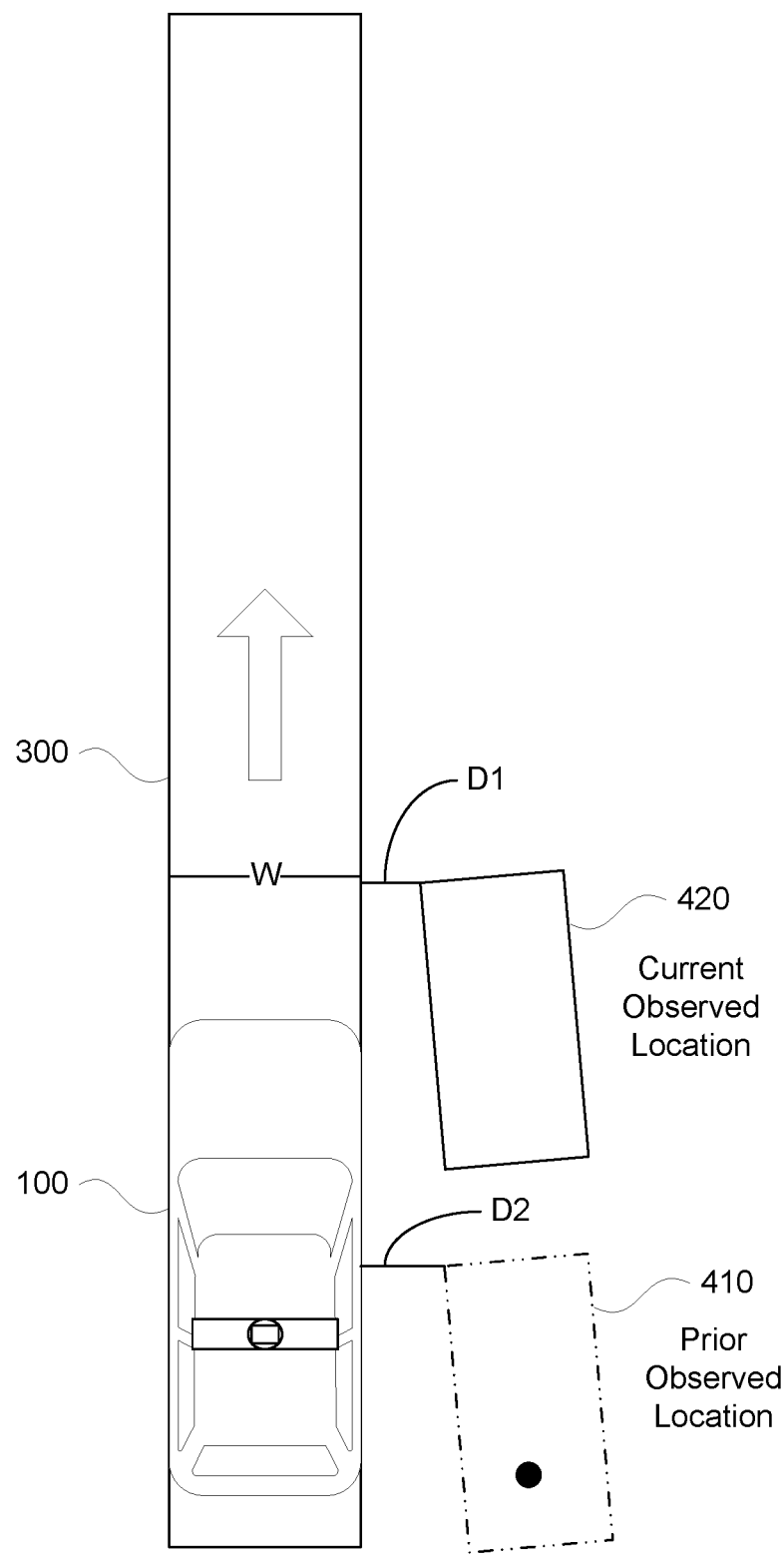

With multiple observations of the same object over time, additional information about the object may be identified by the computing devices 110. This additional information may include lateral gap between the object and the trajectory, relative orientation (or rather, the orientation of the object relative to the orientation of the autonomous vehicle) as well as the lateral speed. As an example and referring to FIGS. 4, D1 and D2 represent lateral gaps between the boundary of the trajectory 300 and the bounding boxes representing the prior observed location 410 and current observed location 420, respectively. The lateral gaps D1 and D2 may be determined by the computing devices 110 by measuring the shortest distance between the bounding box (or other location information) received from the perception system 174 and the boundary of the trajectory 300. As noted above, these lateral gaps may be determined using the boundary of the most recently determined trajectory of the vehicle or the boundary of the most recently determined trajectory of the vehicle when the observed location (current or prior) was received.

Figure 5:
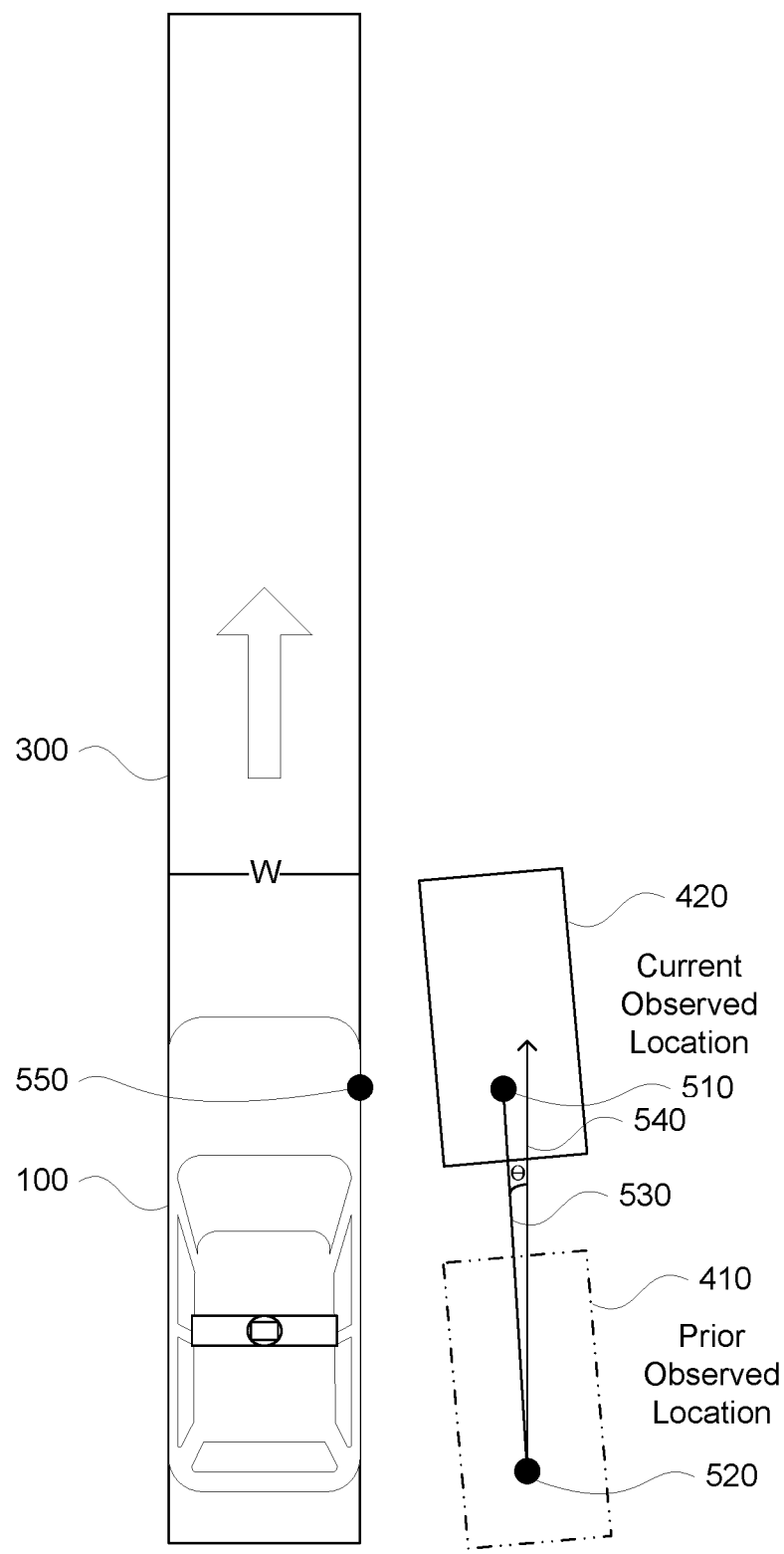

Referring to FIG. 5, the relative orientation may be determined by the computing devices 110 by identifying a point 510, 520 on the object (such as a point on a rear axle for a vehicle) from a current observed location and a prior observed location and plotting a line 530 through those positions. The slope of line 300 relative to the orientation of the vehicle's trajectory 300 (represented by line 540) may be the relative orientation, or angle θ as shown in FIG. 5. Because the orientation of the vehicle's trajectory may change over time, the orientation of the vehicle's trajectory may be the orientation of the boundary at a point closest to the current observed location of the object, represented by point 550. Alternatively, the relative orientation may be determined based on heading information received from the perception system 172.

The lateral speed of the object may be determined by the lateral movement of the point on the object. For instance dividing the difference in distance between the boundary to the point from the current observed location and the prior observed location by the difference in time between the observations may provide an estimate of the lateral speed. In other words, returning to FIG. 4, the difference between D1 and D2 divided by the difference in time between the previous observed location and the current observed location. Alternatively, the lateral speed may be received from the perception system 172.

Figure 6:
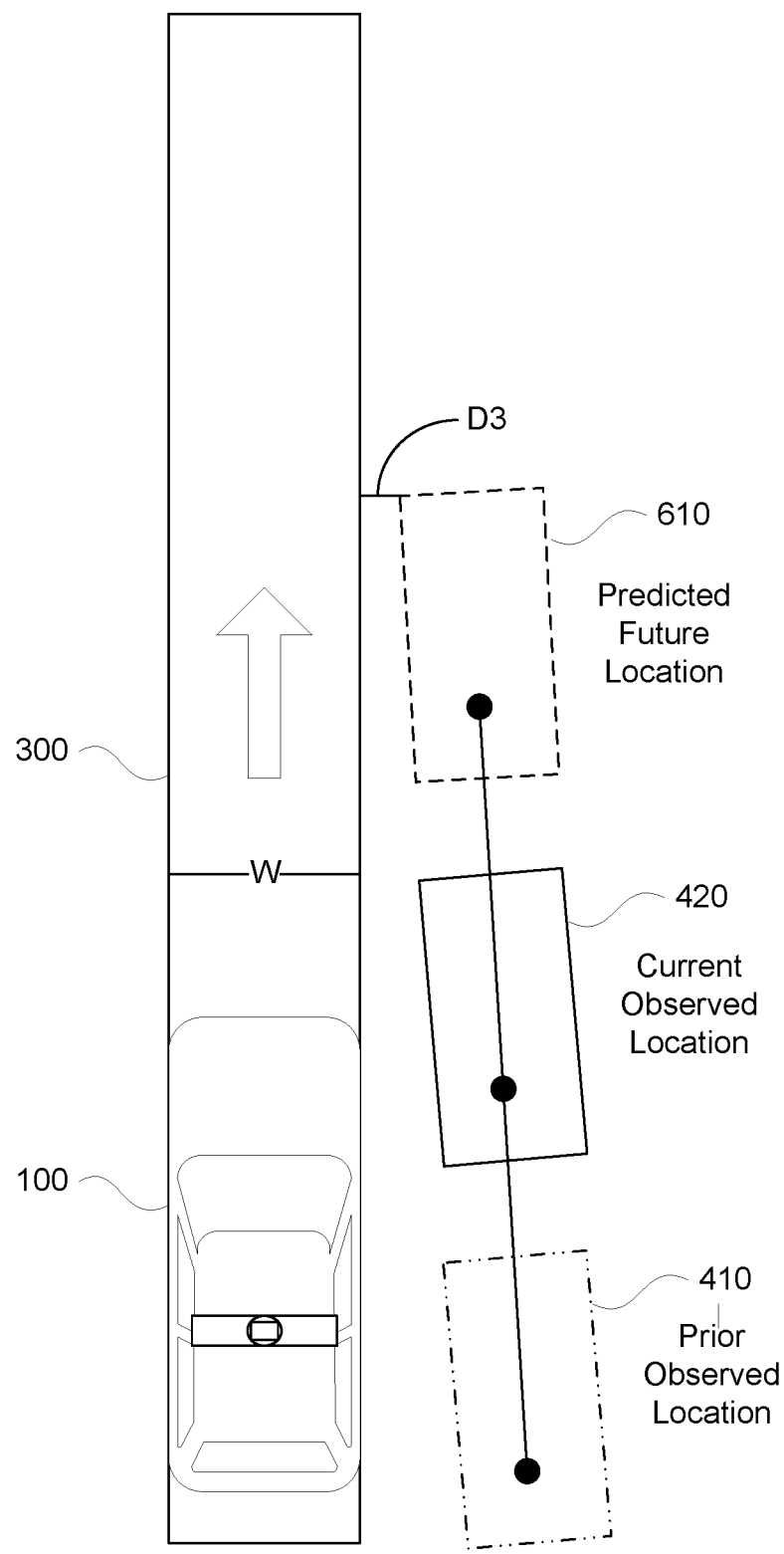

Two or more of the prior observed location, current observed location, lateral gap, lateral speed, and relative orientation may be used to determine whether the object will enter into the boundary of the trajectory of the vehicle. For instance, these may be used to simply determine a future location 610 of the object at some point in the future by plotting a location object at a future time as shown in FIG. 6. In other words, a simple decision logic or forward model that plots the prior observed location, current observed location, as well as lateral and forward velocity may be used to determine the future location 610 of the object. From this future location, a future lateral gap D3 between the future location and the boundary of the trajectory 300 may be determined, for instance as the shortest distance between the future location 610 of the object and the boundary of the trajectory 300. Alternatively, using the lateral speed and current observed location of object may be sufficient to plot a future location of the object at a future time. Again, from this future location, a future lateral gap between the future location and the boundary of the trajectory 300 may be determined.

If the future location is within the boundary of the trajectory or within a threshold distance of the boundary of the trajectory, the object may be identified as an object that is attempting to cut-in. In other words, if the future lateral gap indicates that there is overlap between the object and the trajectory or that the lateral gap is less than a threshold value, the object may be identified as an object that is attempting to cut-in. For instance, if D3 indicates that there is overlap within the boundary of trajectory 300, the computing devices 110 may predict that the object is attempting to enter into the boundary of the trajectory 300. Similarly, if D3 is less than a threshold value, for instance 18 inches or more or less, the computing devices 110 may predict that the object is attempting to enter into the boundary of the trajectory 300. Or, if D3 is greater than or equal to the threshold value, the computing devices 110 may predict that the object is not attempting to enter into the boundary of the trajectory 300, or at least within the period of time including the point when the object is expected to be at the future location.

Figure 7:
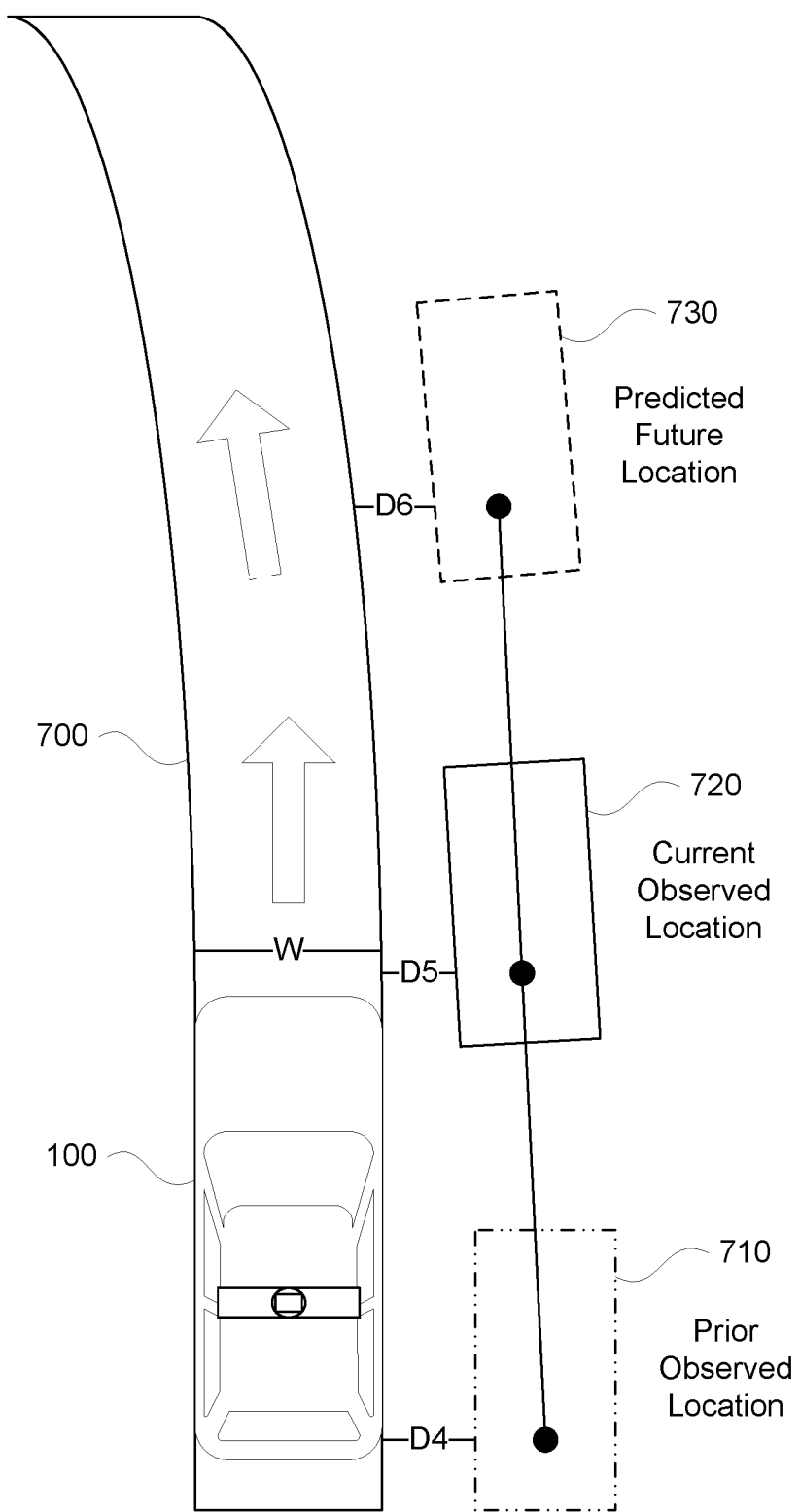

The future lateral gap will of course be affected by the shape of the trajectory. In that regard, the future lateral gap can be adjusted based on the change in orientation of the boundary of the trajectory, and in particular, where the trajectory curves away from the object. Turning to FIG. 7, vehicle 100 is following trajectory 700. As can be seen, the boundary of trajectory 700 curves to the left over time. Using a prior observed location 710 of an object at a distance D4 from the boundary of trajectory 700 and a current observed location 720 of an object at a distance D5 from the boundary of trajectory 700, the computing devices 110 may predict a future location 730 of the object as well as a future lateral gap D6. In this example, the positions of prior observed location 710, current observed location 720 and future location 730 may be comparable to prior observed location 410, current observed location 420, and future location 610 (see FIG. 6). However, while lateral gaps D1 (see FIG. 4) and D4 may be equal in distance, given the curvature (or rather, the change in the orientation) of the boundary of trajectory 700, lateral gap D5 is greater than lateral gap D2 (see FIG. 4), and lateral gap D6 is also greater than lateral gap D3 (see FIG. 6). In this regard, whereas in the example of FIG. 6 the future lateral gap D3 may be less than the threshold value and therefore indicate that the object is going to enter into the boundary of trajectory 330, the same sequence of positions in FIG. 7 may indicate the opposite since the orientation of the boundary of the trajectory changes over time. Thus, in the example of FIG. 6, the computing devices 110 may predict that the object is not be attempting to enter into the boundary of the trajectory 300, while in the example of FIG. 7, the computing devices 110 may predict that the object is not be attempting to enter into the boundary of the trajectory 700.

Figure 8A:
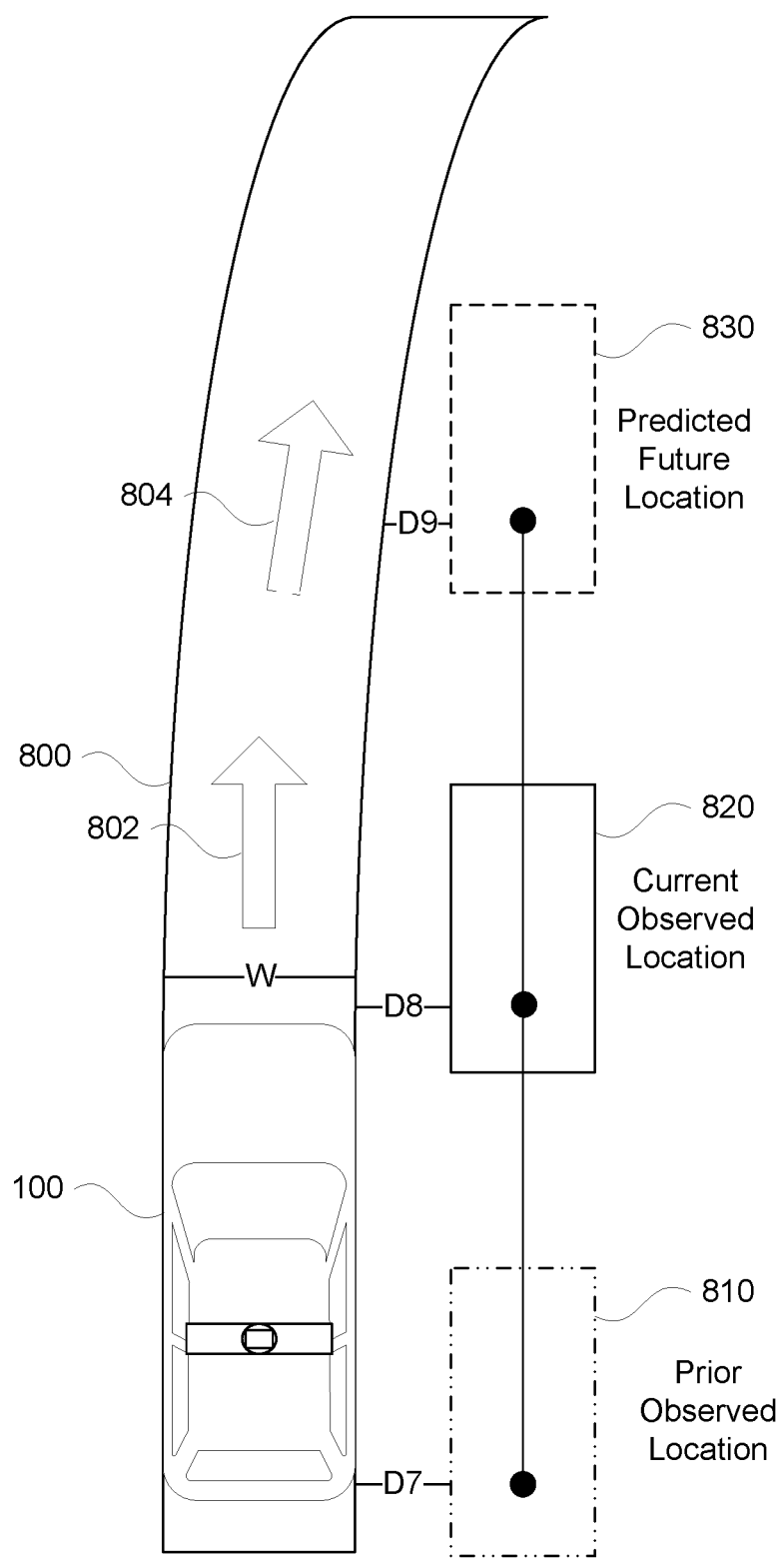

Turning to FIG. 8A, vehicle 100 is following trajectory 800. As can be seen, the boundary of trajectory 800 curves to the right over time. Using a prior observed location 810 of an object at a distance D7 from the boundary of trajectory 800 and a current observed location 820 of an object at a distance D8 from the boundary of trajectory 800, the computing devices 110 may predict a future location 830 of the object as well as a future lateral gap D9. However, as can be seen, because the boundary of the trajectory 800 curves to the right, the future lateral gap D9 is smaller than D8. In other words, a simple forward projection of the location of the object will likely cause the computing devices 110 to determine that the object is attempting to enter into the trajectory 800.

Figure 8B:
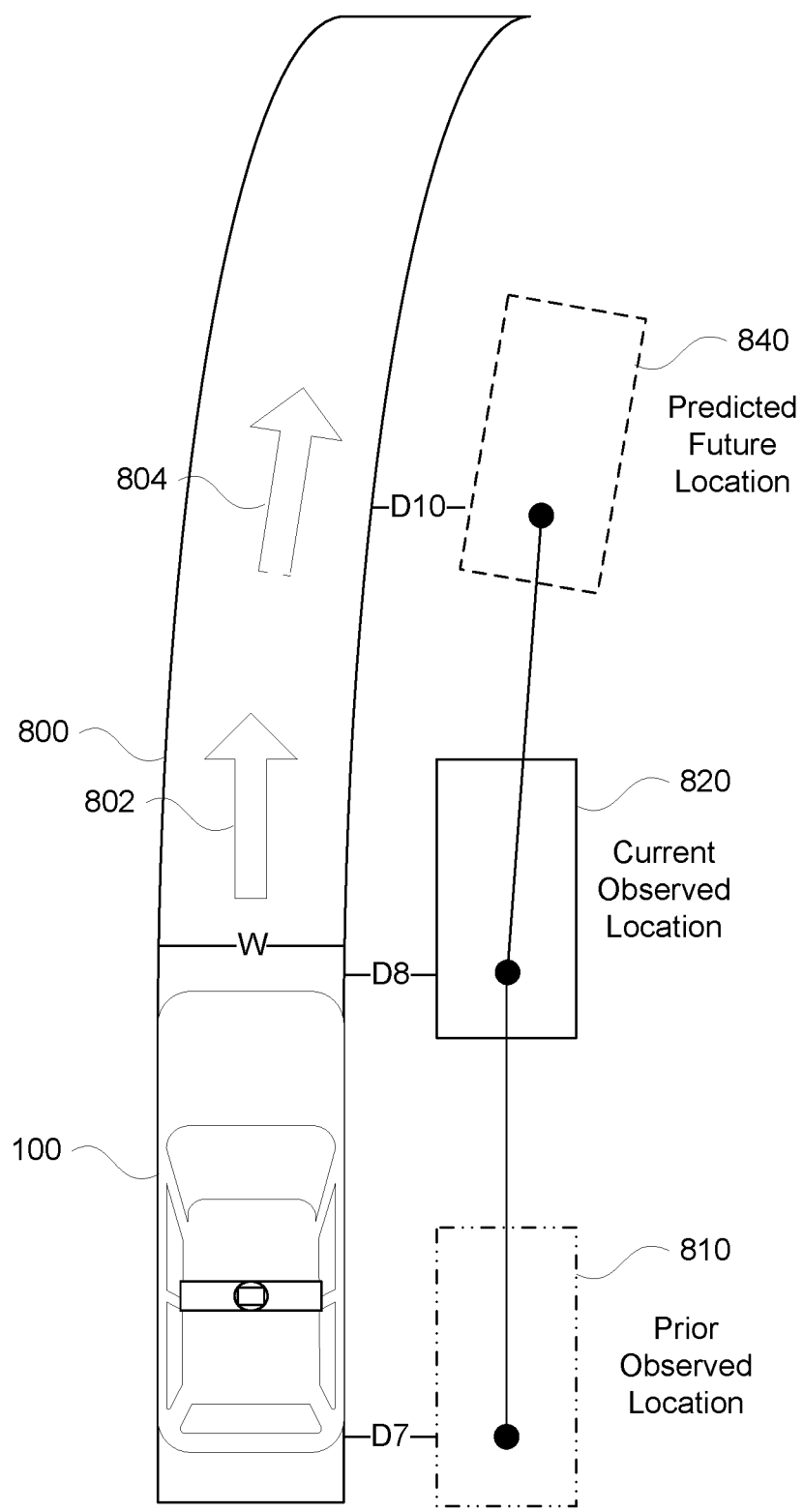

To reduce the likelihood of such false positives, and in particular, where the trajectory curves toward the object the change in orientation of the boundary of the trajectory, or the yaw rate of the trajectory can be used to predict the future location of the object. For instance, the change in orientation of the vehicle's trajectory over time may also be used to adjust the yaw rate (change in orientation over time) of the object when determining the future predicted location. For example, turning to FIG. 8B, the future predicted location 840 is adjusted using the yaw rate (here, depicted as the angular difference between arrows 802 and 804) of the trajectory 800. This makes the prediction of the future location 840 relative to current observed location 820 also move to the right with the boundary of trajectory 800. In this way, the lateral gap D10 (FIG. 8B) is greater than the lateral gap D8 (FIG. 8A), and thus, the adjustment prevents or reduces the likelihood of false positive determinations that the object is attempting to enter into the trajectory of the vehicle.

The computing devices 110 may then use this prediction to control the maneuvering of the vehicle. For instance, if the computing devices 110 predict that the object is not attempting to enter into the boundary of the trajectory 300, the computing devices 110 may continue to follow trajectory 300 until a new trajectory is determined, for instance, using updated information from the perception system 172. If the computing devices 110 predict that the object is attempting to enter into the boundary of the trajectory, the computing devices may decelerate the vehicle or in some cases accelerate the vehicle in order to avoid coming too close to the object, effectively following trajectory 300, but using a different speed profile. In this regard, because the vehicle is accelerated or decelerated, the timing of the vehicle reaching different points on the trajectory may change. This ensures that the vehicle is safely in front of or behind the object should the object actually proceed to enter into the vehicle's trajectory, and in particular, where the trajectory curves away from the object While not necessary to the decision making, additional contextual information may also be taken into consideration when predicting whether an object is attempting to enter into the boundary of the vehicle's trajectory. This additional contextual information may be determined by the perception system, such as whether the object is using a turn signal which would indicate that the object is moving towards the trajectory, the type of the object (a pedestrian or bicyclist may be more or less likely to enter into the trajectory), whether the object has crossed a lane boundary (either detected in real time and/or determined from the map information), as well as the distance between the object and the edge of the lane in which the object currently is located.

The accuracy of these predictions can be increased by using machine learning techniques. For instance, data collected by the perception system including instances where an object in an adjacent lane actually enter into the lane of a vehicle may be labeled as positive examples. All other instances may be labeled as negative examples. The aforementioned information, including trajectory, prior observed location, current observed location, lateral gap, lateral speed, and relative orientation may be used as input to a machine learning model for each positive and negative instance. The information and labeled data may be used to train the machine learning model that identifies whether the object is attempting to enter into the trajectory (and in reality, the lane), of the autonomous vehicle. This training may allow the machine learning model to identify more robust threshold values for identifying whether an object is attempting to cut-in.

In addition to being used for autonomous vehicles, the aforementioned features may also be used in other types of vehicles, such as those controlled by a human driver or which operate in a semi-autonomous mode. As such, when an object is determined to be cutting into the lane of such a vehicle, the computing devices may provide an audible or visual warning to the driver in order to assist the driver in making driving decisions.

When the autonomous vehicle is moving, the autonomous vehicle's computing devices may determine whether and which other objects are going to enter into this most recently generated trajectory as discussed below. In that regard, this determination need not occur when the autonomous vehicle is stopped in order to limit unnecessary processing.

Figure 9:
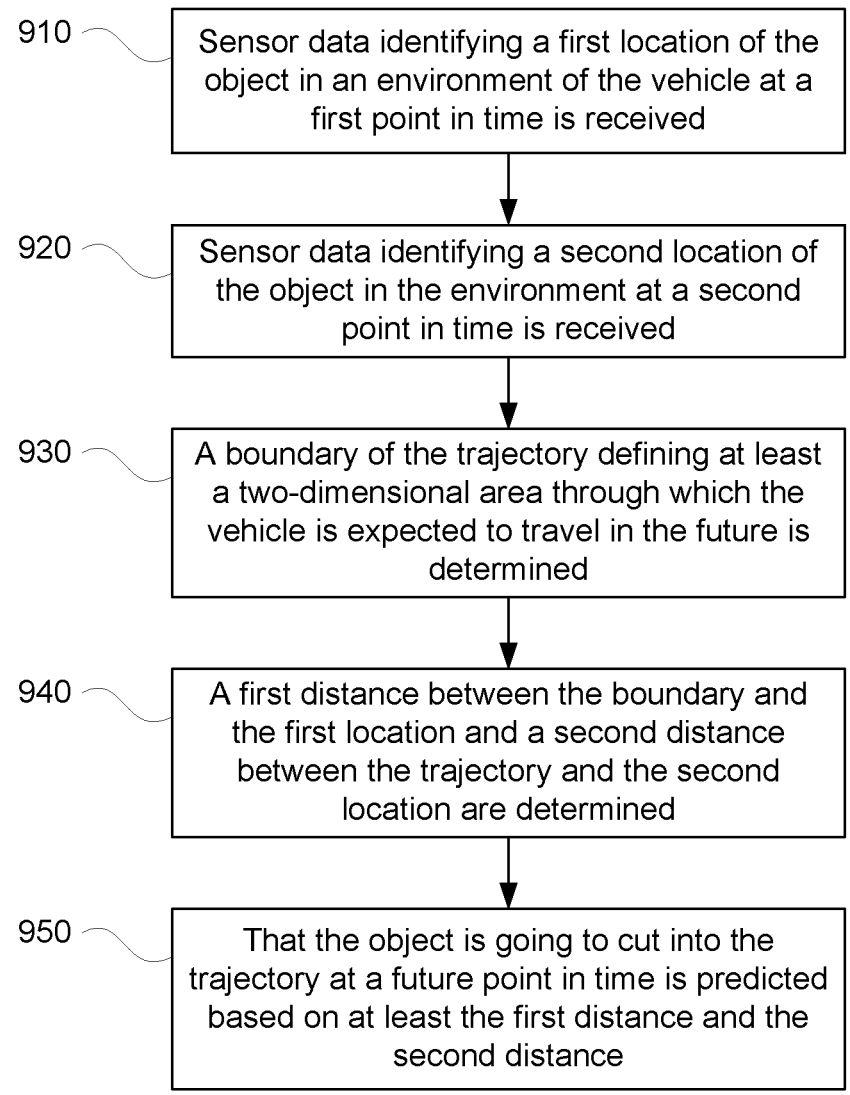
FIG. 9 is a flow diagram in accordance with aspects of the disclosure.

FIG. 9 is an example flow diagram 900 in accordance which may be performed by one or more processors of one or more computing devices of a vehicle, such as computing devices 110 of vehicle 100 in order to predict that an object that is going to enter into a trajectory of a vehicle. For instance, at block 910, sensor data identifying a first location of the object in an environment of the vehicle at a first point in time is received. Sensor data identifying a second location of the object in the environment at a second point in time is received at block 920. A boundary of the trajectory defining at least a two-dimensional area through which the vehicle is expected to travel in the future is determined at block 930. A first distance between the boundary and the first location and a second distance between the trajectory and the second location are determined at block 940. That the object is going to enter into the trajectory at a future point in time is predicted based on at least the first distance and the second distance at block 950.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for predicting that an object is going to enter into a trajectory of a vehicle, the method comprising:
   receiving, by one or more processors of one or more computing devices, sensor data identifying a first location of the object in an environment of the vehicle at a first point in time, wherein the object is represented by a bounding box;
   receiving, by the one or more processors, sensor data identifying a second location of the object in the environment at a second point in time;
   determining, by the one or more processors, a boundary of the trajectory, the boundary defining at least a two-dimensional area through which the vehicle is expected to travel over a period of time;
   determining, by the one or more processors, a shortest first distance between the boundary and the bounding box when the object is located at the first location and a shortest second distance between the boundary and the bounding box when the object is located at the second location;
   determining, by the one or more processors, a shortest third distance between the boundary and the bounding box when the object is located at a future location at a future point in time; and
   predicting, by the one or more processors, that the object is going to enter into the trajectory at the future point in time based on at least the shortest first distance, the shortest second distance, the shortest third distance, the first point in time and the second point in time.

2. The method of claim 1, wherein the predicting that the object is going to enter into the trajectory is further based on a difference in time between the first point in time and the second point in time.

3. The method of claim 1, wherein the predicting that the object is going to enter into the trajectory is not based on pre-stored map information describing the environment of the vehicle.

4. The method of claim 1, wherein the boundary defines a three-dimensional area.

5. The method of claim 1, wherein the predicting that the object is going to enter into the trajectory includes:
   predicting the future location of the object at the future point in time based on at least the shortest first distance and the shortest second distance.

6. The method of claim 1, wherein the predicting that the object is going to enter into the trajectory includes:
   predicting a future location of the object at the future point in time based on at least the shortest first distance and the shortest second distance; and
   determining whether the future location is within the boundary.

7. The method of claim 1, wherein the predicting that the object is going to enter into the trajectory includes using the shortest first distance and the shortest second distance as input into a machine learning model.

8. The method of claim 1, further comprising prior to the determining the shortest first distance and the shortest second distance, identifying the object as an object that may want to enter into the trajectory based on either the first location or the second location.

9. The method of claim 8, wherein the identifying the object is based on whether the first location or second location indicates that the object is in a lane adjacent to the lane of the vehicle.

10. The method of claim 9, wherein the lane adjacent and the lane of the vehicle both follow a given directional flow of traffic.

11. The method of claim 1, wherein the shortest first distance, the shortest second distance and the shortest third distance between the boundary and the bounding box are used to measure lateral gaps.

12. A system for predicting that an object is going to enter into a trajectory of a vehicle, the system comprising one or more processors configured to:
   receive sensor data identifying a first location of the object in an environment of the vehicle at a first point in time, wherein the object is represented by a bounding box;
   receive sensor data identifying a second location of the object in the environment at a second point in time;
   determine a boundary of the trajectory, the boundary defining at least a two-dimensional area through which the vehicle is expected to travel over a period of time;
   determine a shortest first distance between the boundary and the bounding box when the object is located at the first location and a shortest second distance between the boundary and the bounding box when the object is located at the second location;
   determine a shortest third distance between the boundary and the bounding box when the object is located at a future location at a future point in time; and
   predict that the object is going to enter into the trajectory at the future point in time based on at least the shortest first distance, the shortest second distance, the shortest third distance, the first point in time and the second point in time.

13. The system of claim 12, wherein the prediction that the object is going to enter into the trajectory is not based on pre-stored map information describing the environment of the vehicle.

14. The system of claim 12, wherein the boundary defines a three-dimensional area.

15. The system of claim 12, wherein the one or more processors are configured to predict that the object is going to enter into the trajectory by:

predicting the future location of the object at the future point in time based on at least the shortest first distance and the shortest second distance.

16. The system of claim 12, wherein the one or more processors are configured to predict that the object is going to enter into the trajectory by:
   predicting a future location of the object at the future point in time based on at least the shortest first distance and the shortest second distance; and
   determining whether the future location is within the boundary.

17. The system of claim 15, wherein the one or more processors are configured to predict that the object is going to enter into the trajectory by using the shortest first distance and the shortest second distance as input into a machine learning model.

18. The system of claim 12, further comprising the vehicle.

19. The system of claim 12, wherein the shortest first distance, the shortest second distance and the shortest third distance between the boundary and the bounding box are used to measure lateral gaps.

20. A method for predicting that an object is going to enter into a trajectory of a vehicle, the method comprising:
   receiving, by one or more processors of one or more computing devices, sensor data identifying a location of the object in an environment of the vehicle at a first point in time and a lateral speed of the object at the first point in time, wherein the object is represented by a bounding box;
   determining, by the one or more processors, a boundary of the trajectory, the boundary defining at least a two-dimensional area through which the vehicle is expected to travel;
   determining, by the one or more processors, a shortest first distance between the boundary and the bounding box when the object is located at the location;
   determining a shortest second distance between the boundary and the bounding box when the object is located at a future location at a future point in time; and
   predicting, by the one or more processors, that the object is going to enter into the trajectory at the future point in time based on at least the shortest distance between the boundary and the bounding box when the object is located at the location, the shortest distance between the boundary and the bounding box when the object is located at the future location at the future point in time, the lateral speed and the first point in time.

* * * * *